United States Patent
Van Lunteren et al.

(10) Patent No.: US 11,886,725 B2
(45) Date of Patent: Jan. 30, 2024

(54) ACCELERATING DECISION TREE INFERENCES

(71) Applicant: International Business Machines Corporation, Armonk, NY (US)

(72) Inventors: Jan Van Lunteren, Rüschlikon (CH); Charalampos Pozidis, Thalwil (CH)

(73) Assignee: International Business Machines Corporation, Armonk, NY (US)

(*) Notice: Subject to any disclaimer, the term of this patent is extended or adjusted under 35 U.S.C. 154(b) by 340 days.

(21) Appl. No.: 17/347,918

(22) Filed: Jun. 15, 2021

(65) Prior Publication Data
US 2022/0398015 A1    Dec. 15, 2022

(51) Int. Cl.
*G06F 7/00* (2006.01)
*G06F 3/06* (2006.01)
(Continued)

(52) U.S. Cl.
CPC .......... *G06F 3/064* (2013.01); *G06F 3/0604* (2013.01); *G06F 3/0656* (2013.01);
(Continued)

(58) Field of Classification Search
CPC ...... G06F 3/064; G06F 3/0604; G06F 3/0656; G06F 3/0673; G06F 12/0895;
(Continued)

(56) References Cited

U.S. PATENT DOCUMENTS

| | | | |
|---|---|---|---|
| 2013/0044924 A1* | 2/2013 | Spencer | G06V 10/955 600/463 |
| 2015/0379426 A1 | 12/2015 | Steele | |

(Continued)

FOREIGN PATENT DOCUMENTS

| CN | 111368901 A | 7/2020 |
|---|---|---|
| CN | 110245515 B | 6/2021 |

OTHER PUBLICATIONS

International Search Report and Written Opinion, International Application No. PCT/IB2022/054598, International Filing Date Sep. 5, 2022.

(Continued)

*Primary Examiner* — Isaac M Woo
(74) *Attorney, Agent, or Firm* — Stephen R. Yoder; Aaron N. Pontikos

(57) ABSTRACT

Methods, computer program products, and/or systems are provided that perform the following operations: setting a memory buffer having contiguous memory blocks; obtaining a decision tree comprising nodes including split nodes and leaf nodes, wherein each of the split nodes includes at least two child nodes that are ordered according to a likelihood of accessing a child node after each of the split nodes; mapping the nodes onto respective blocks of the memory blocks, each of the memory blocks storing attributes of a corresponding one of the nodes, wherein each of the split nodes and any child nodes of each split node are mapped onto successive blocks, wherein ordered child nodes of a same one of the split nodes are mapped onto successive blocks; executing the nodes by processing the attributes of the nodes as accessed from the memory according to an order of the memory blocks in the memory buffer.

20 Claims, 6 Drawing Sheets

(51) Int. Cl.
*G06N 20/20* (2019.01)
*G06F 17/11* (2006.01)
*G06F 12/0895* (2016.01)
*G06N 5/01* (2023.01)

(52) U.S. Cl.
CPC ........ *G06F 3/0673* (2013.01); *G06F 12/0895* (2013.01); *G06F 17/11* (2013.01); *G06N 5/01* (2023.01); *G06N 20/20* (2019.01); *G06F 2212/608* (2013.01)

(58) Field of Classification Search
CPC .............. G06F 17/11; G06F 2212/60; G06F 2212/608; G06N 20/20; G06N 5/01
USPC .................................................. 707/600–899
See application file for complete search history.

(56) References Cited

U.S. PATENT DOCUMENTS

2017/0212680 A1   7/2017   Waghulde
2020/0065256 A1   2/2020   Palmer

OTHER PUBLICATIONS

Lakhotia et al., "ReCALL: Reordered Cache Aware Locality Based Graph Processing", 2017 IEEE 24th International Conference on High Performance Computing (HiPC), pp. 273-282, DOI 10.1109/HiPC.2017.00039.

Lettich et al., "Parallel Traversal of Large Ensembles of Decision Trees", IEEE Transactions on Parallel and Distributed Systems, Aug. 9, 2018, 15 pages, DOI 10.1109/TPDS.2018.2860982, (c) 2018 IEEE.

Luca et al., "Fast inference engine for Decision Trees", CERN, Meyrin, Switzerland, Sep. 6, 2019, 10 pages.

Tracy II, Tommy James, "Accelerating Decision Tree Ensemble Inference with an Automata Representation", A Dissertation Presented to the Graduate Faculty of the University of Virginia in Candidacy for the Degree of Doctor of Philosophy, Department of Computer Engineering, University of Virginia, Aug. 2019, 140 pages.

* cited by examiner

ACCELERATING DECISION TREE INFERENCES

BACKGROUND

The present invention relates generally to the field of decision trees. In particular, the present invention is directed to accelerating decision tree inferences.

SUMMARY

According to aspects of the present invention, a method, computer program product and/or system is provided that performs the following operations (not necessarily in the following order): setting, in a memory, a memory buffer that includes contiguous memory blocks; obtaining a decision tree that comprises nodes including split nodes and leaf nodes, wherein each of the split nodes includes at least two child nodes that are ordered according to a likelihood of accessing a child node after each of the split nodes; mapping the nodes onto respective blocks of the memory blocks, each of the memory blocks store attributes of a corresponding one of the nodes, wherein the mapping is performed according to a depth-first search order, wherein each of the split nodes and any child nodes of each split node are mapped onto successive blocks of the memory blocks, wherein ordered child nodes of a same one of the split nodes are mapped onto successive blocks of the memory blocks; executing the nodes by processing the attributes of the nodes as accessed from the memory according to an order of the memory blocks in the memory buffer; and returning an inference result based on an outcome of executing the nodes.

BRIEF DESCRIPTION OF THE DRAWINGS

These and other objects, features, and advantages of the present invention will become apparent from the following detailed description of illustrative embodiments thereof, which is to be read in connection with the accompanying drawings. The illustrations are provided for clarity in facilitating one skilled in the art in understanding the invention in conjunction with the detailed description. In the drawings:

FIGS. 4A and 4B depict blocks of memory buffers onto which attributes of nodes are mapped, according to embodiments of the present disclosure. In each of FIGS. 4A and 4B, each split node is mapped onto a memory block of 8 bytes, wherein each block is decomposed in two sub-blocks of 4 bytes each. In FIG. 4A, each leaf node is mapped onto a block of 4 bytes, whereas, in FIG. 4B, each leaf node is mapped onto a block of 8 bytes, according to embodiments of the present disclosure;

The accompanying drawings show simplified representations of devices or parts thereof, as involved in embodiments. Similar or functionally similar elements in the figures have been allocated the same numeral references, unless otherwise indicated.

Computerized methods and computer program products embodying the present invention will now be described, by way of non-limiting examples.

DETAILED DESCRIPTION

According to aspects of the present disclosure, methods, systems, and/or computer program products are provided for accelerating decision tree inferences. In particular, embodiments of the methods, systems, and/or computer program products provide for swapping some nodes of a decision tree in accordance with their likelihood of access. The nodes are executed by processing node attributes accessed from memory according to an order of memory blocks of a memory buffer, onto which attributes of the decision tree nodes are mapped according to a depth-first search order.

Decision tree learning is a predictive modelling approach used in machine learning. It relies on one or more decision trees, forming the predictive model. Decision trees are widely used machine learning algorithms, owing to their simplicity and interpretability. Different types of decision trees are known, including classification trees and regression trees. A binary decision tree is basically a structure involving coupled decision processes. Starting from the root, a feature is evaluated, and one of the two branches of the root node is selected. This procedure is repeated until a leaf node is reached, a value of which is used to assemble a final result.

Random forest and gradient boosting are important machine learning methods, which are based on binary decision trees. In such methods, multiple decision trees are "walked" in parallel until leaf nodes are reached. The results taken from the leaf nodes are then averaged (regression) or used in a majority vote (classification). Such computations can be time (and resources) consuming, hence there may be a need for accelerating tree-based inference, notably for random forest and/or gradient boosting methods.

Accelerating tree-based inference such as for random forest and gradient boosting methods, can be achieved by speeding up either: (i) the individual binary decision tree processing, and/or (ii) the parallel processing of multiple binary decision trees. The present invention focuses on the first approach, although embodiments address the second approach as well.

Figures 4A, 4B:
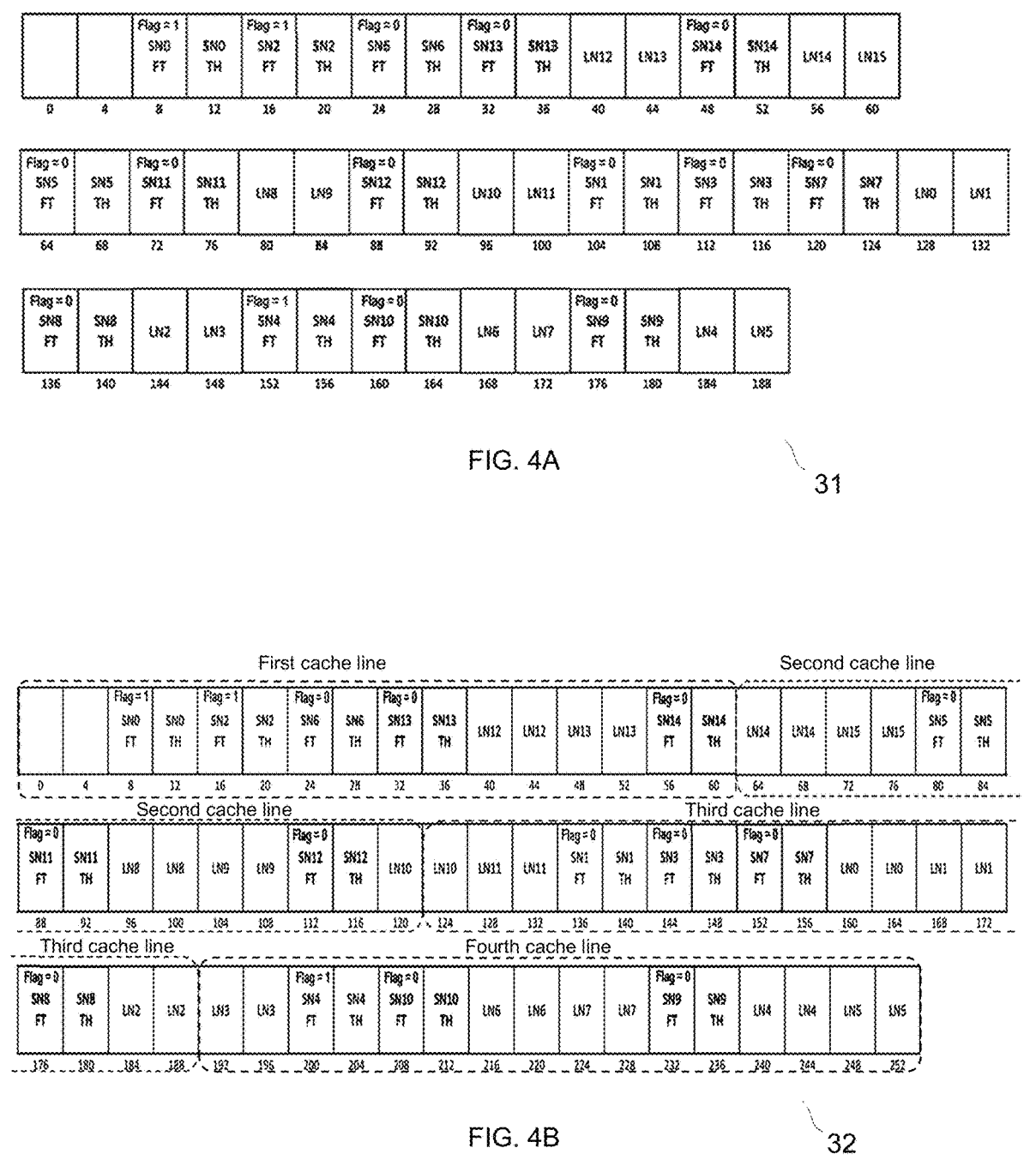
Figure 5:
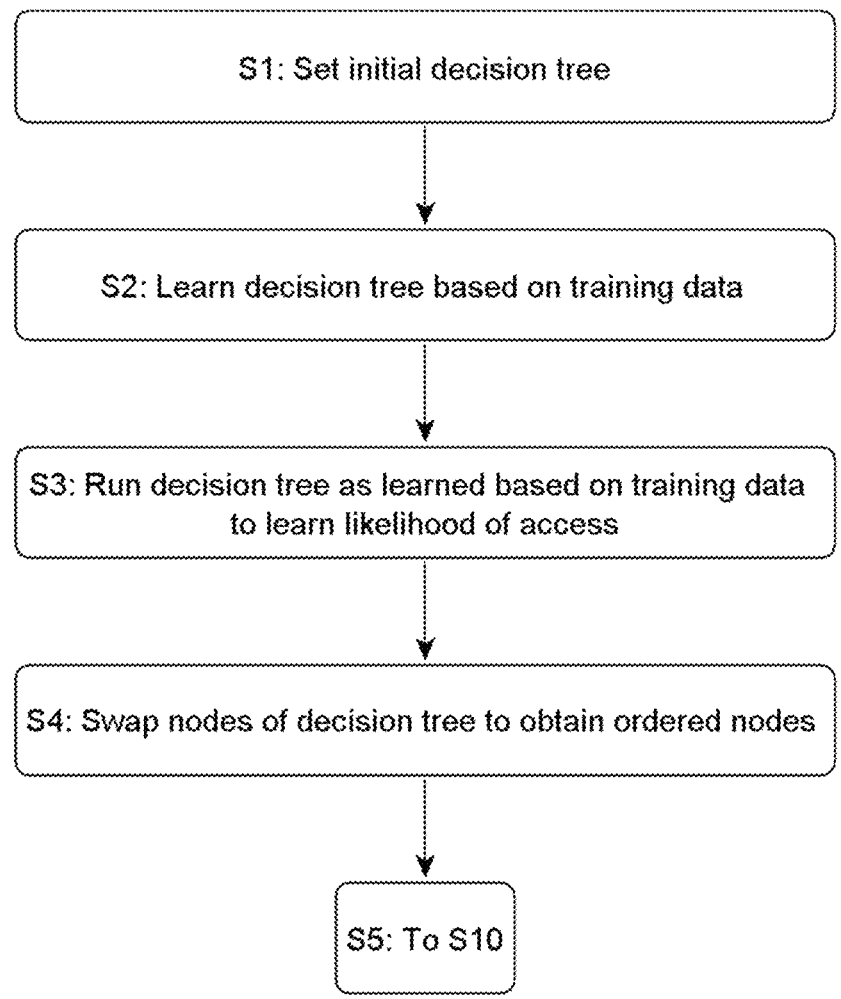
FIG. 5 is a flowchart illustrating high-level, preliminary steps performed to obtain a decision tree with suitably ordered nodes, according to embodiments of the present disclosure.
Figure 6:
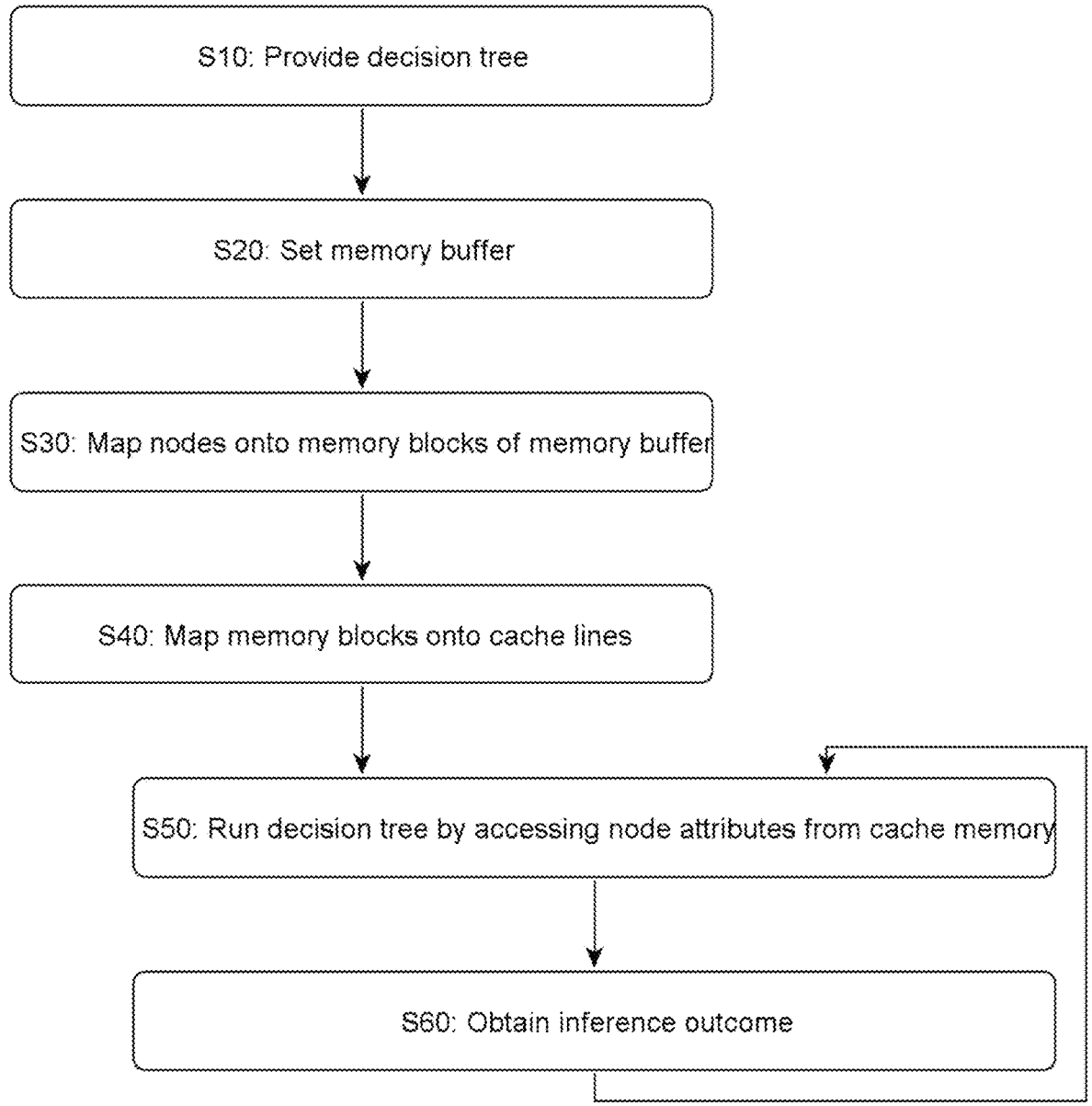
FIG. 6 is a flowchart illustrating high-level steps of a method of accelerating inferences by executing re-ordered nodes of a decision tree, according to embodiments of the present disclosure.

In reference to FIG. 2 through FIG. 6, a first aspect of the invention is now described in detail, which provides a method of accelerating decision tree inferences. An embodiment of the method can essentially include setting a memory buffer at S20, mapping suitably arranged nodes of a decision tree onto blocks of this memory buffer at s#0 and S40, and executing the nodes at S50 to return a result at S60, as depicted in FIG. 6. Note, this method and its variants may be collectively referred to as the "present methods" in this disclosure. All references Sn refer to method steps of the flowcharts of FIG. 5 and FIG. 6, while numeral references pertain to physical parts or components of the computerized unit shown in FIG. 7, and concepts (such as decision trees and decision tree nodes) utilized in embodiments of the present invention.

In detail, the memory buffer is set (at step S20 in FIG. 6) in a memory of a computerized unit 101 or a computerized system used to perform the method. This memory buffer includes contiguous memory blocks, which are not yet populated at this point.

Next, a decision tree 20 is accessed (step S10 of FIG. 6). This tree is assumed to have been suitably re-arranged. That is, given an initial tree 10 (FIG. 1), at least some of the nodes 110 are re-ordered according to their likelihood of access, to obtain a decision tree 20 such as shown in FIG. 2. The nodes 120 include split nodes and leaf nodes. The split nodes are denoted by references SN0 (corresponding to the root node) to SN14, while the leaf nodes are denoted by references LN0 to LN15 in the examples of FIGS. 1 and 2.

Once the tree is re-arranged (FIG. 2), each split node includes at least two child nodes that are ordered according to their likelihood of access after this split node. In other words, in each layer, the child nodes of a same parent are ordered according to a likelihood of access, such that a first child node of a given split node is more likely accessed, statistically, than the second child node of that same split node. Similarly, the second child node of this split node is more likely accessed than the third child node, etc. When considering a pictorial representation of the tree 20, this amounts to say that child nodes are all ordered along a same direction, such as from a same side of the decision tree 20 (e.g., from the left-hand side in the example tree of FIG. 2).

Several methods can be used to determine likelihoods of access. The ordering of the nodes 120 can notably be based on conditional probabilities of execution of the nodes, for example, probabilities of accessing a given child after its parent nodes has been executed. Where clear paths (or sequences) of nodes can be identified, which are "hotter" in terms of decision paths than paths passing though surrounding nodes, child nodes can be swapped so that the most likely node is always on the left (or always on the right-hand side). Likelihoods of access can for instance be determined using training data or any other representative (e.g., validation data, test data, etc.), as discussed later in detail.

Figure 3:
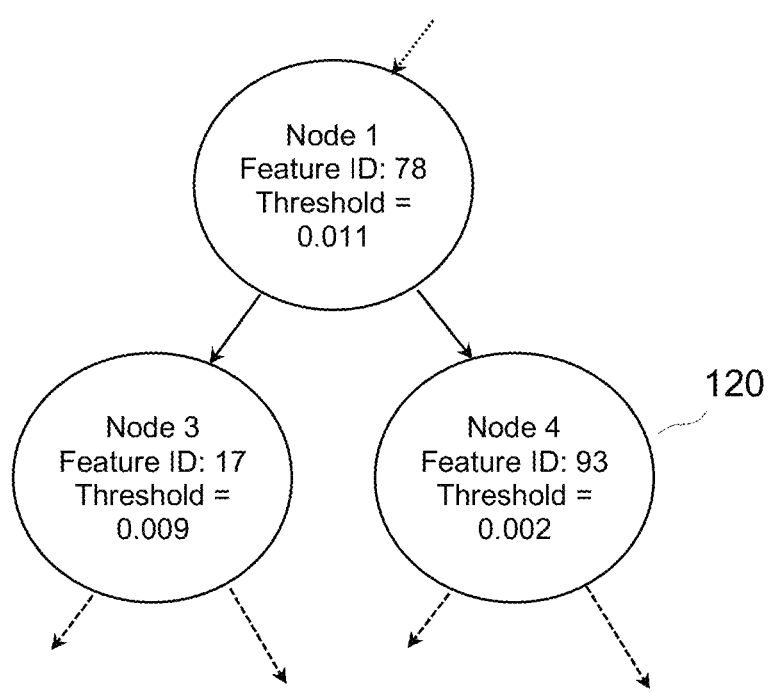
FIG. 3 shows a selection of connected nodes of the decision tree of FIG. 2, together with feature identifiers and threshold values of the nodes as used to execute such nodes, according to embodiments of the present disclosure.

Then, the re-ordered nodes 120 are mapped (at step S30) onto respective blocks of the memory blocks of the previously set buffer 31, 32. As a result of the mapping operation at step S30, each memory block stores attributes of a corresponding node 120, which may either be a split node or a leaf node. Attributes of the nodes can include operands required to execute the nodes. They may, for instance, include feature identifiers (also called feature selectors) and/or thresholds used for comparisons and, more generally, all arguments needed for evaluating the rules captured by the decision tree nodes. Each split node of a decision tree is labelled with a feature identifier and is associated with a threshold to perform an operation, whereby, for example, a feature value corresponding to a feature identifier is compared to a threshold, as known per se. This is illustrated in FIG. 3, which depicts selected nodes 120 of the tree 20, together with respective feature identifier values ("feature ID") and threshold values.

Interestingly, in some embodiments, the mapping at S30 can be performed according to a depth-first search (DFS) order, as opposed to the breadth-first order generally used for decision trees. As a result, each split node and any of its child nodes are mapped onto successive blocks of the memory blocks. Meanwhile, because at least some of nodes 120 have been reordered, the DFS mapping causes the ordered child nodes of a same parent node (a split node) to be mapped onto successive blocks as well.

Importantly, "successive" does not necessarily mean "consecutive", i.e., directly following the previous one. Rather, successive means coming after another. For example, 1, 5, 9, 18, etc., are successive numbers, but not consecutive numbers (like 1, 2, 3, 4, . . . ). However, the first child node of each split node (i.e., the more likely node to be accessed after that split node, in operation) may advantageously be mapped onto a memory block that is consecutive to the block corresponding to that split node. Note, each of the memory blocks onto which node attributes are mapped may in fact consist of two consecutive sub-blocks, for reasons that will become apparent later.

The nodes 120 are subsequently executed at S50 by processing the attributes of the nodes 120 as accessed from the memory. Yet, such attributes are accessed according to an order of the memory blocks in the memory buffer 31, 32. For example, in some embodiments, the access order is imposed by the order set in the memory buffer 31, 32, as of after the mapping operation at S30. Note, the memory buffer 31, 32 can be typically implemented as a virtual data buffer, in software, although it may, in principle, be implemented in hardware too, in a given memory location of this hardware. The memory buffer can advantageously be used to map data it contains onto contiguous memory cache lines, as in some embodiments described later.

Finally, an inference result is returned at step S60. This result is based on an outcome of executing the nodes 120. Several decision trees may similarly be executed, as in ensemble models, for example, a random forest or a gradient boosting model. Thus, a global result may eventually be constructed based on inference results obtained from each decision tree, for example, for classification or regression purposes.

According to embodiments of the present methods, the block structure of the memory buffer 31, 32 used to execute the nodes reflects the arrangement of the decision tree 20 as obtained after re-ordering at least some of its nodes 120. That is, for each split node of this decision tree 20, the first child node is always on a same processing side. The memory blocks of the memory buffer are located at consecutive offsets, which do not need to be constant, though they may well be. Using constant offsets for the split nodes and constant offsets for the leaf nodes makes it easier to rely on an implicit ordering of the blocks, such that no explicit pointer to the child blocks (i.e., blocks corresponding to child nodes) need be stored in the memory blocks.

The proposed approach can provide multiple advantages. To start with, for example, it can allow the spatial locality of the data to be better exploited, be it in the memory blocks or in the cache lines onto which such blocks are mapped, owing to the optimized order of the memory blocks. As an example, upon executing the nodes, a single cache line may be loaded, which contains attributes of nodes on a most likely execution path. A single cache line may possibly contain all the necessary attributes required for executing all the nodes on that path. This, in turn, can result in higher cache performance and utilization of the memory bandwidth caches and main memory. Namely, fewer memory accesses may be needed.

Various embodiments of the present invention result in substantial reductions of storage requirements, as well as substantial improvements of inference latency and throughput. In particular, embodiments make it possible to reduce inference times by a factor ranging between 1.5 and 70

(approximately), this depending on the test data, reference methods, and the platforms considered. In practice, however, inference times can typically be reduced by a factor that is between 2 and 3.

Moreover, the present disclosure can advantageously support vector-processing for decision trees, as discussed below in reference to some embodiments. As a result, multiple nodes of a same decision tree can be processed in parallel, resulting in higher processing efficiency for a given memory access granularity (e.g., cache line). The present invention can further be applicable to multiple inference platforms, including Central processing Units (CPUs) and Field-Programmable Gate Arrays (FPGAs), for example.

All this is now described in detail, in reference to particular embodiments of the invention. To start with, as provided earlier, the memory buffer 31, 32 may advantageously be mapped (step S40 in FIG. 6) onto cache lines of a cache memory used to execute the nodes, in accordance with the order of the blocks as set in the memory buffer. That is, the memory blocks of the memory buffer 31, 32 are orderly mapped onto memory blocks of the cache lines, following the same order of the memory blocks as set in the buffer 31, 32, as illustrated in FIG. 4B. Thus, the nodes 120 are subsequently executed at S50 by processing the attributes of the nodes 120 as obtained from the memory blocks of the cache lines.

Note, embodiments of the present disclosure can be implemented using any cache level, especially where the nodes 120 are executed by a CPU. For implementations with FPGAs, cache lines can be fetched from the main memory and fed to the internal memory of the FPGAs, which can be regarded as cache memory for FPGAs.

Advantageously, in some embodiments, the memory blocks corresponding to split nodes do not need to include pointers to child nodes of these split nodes. Rather, embodiments of the present disclosure may rely on an implicit ordering of the memory blocks. To make this easier, in some embodiments, one may impose that the memory blocks that correspond to split nodes have all a same size S, while the memory blocks corresponding to leaf nodes may all have a same size L. Note, L does not need to be equal to S. In practice, L can typically be smaller than or equal to S. Knowing the offsets between the memory blocks can make it easier to determine where to access the attributes of the nodes 120 from the memory according to the implicit ordering of the memory blocks that results from the chosen mapping. Thus, there may be no need to store pointers in the memory blocks.

How the relevant memory blocks can be retrieved is explained below, in reference to some preferred embodiments. To start with, some parent-child node pairs may advantageously be mapped onto consecutive (and not merely successive) blocks. That is, the mapping at S30 can be performed so as for any two memory blocks consisting of a split block and a first child block to be consecutive memory blocks in the memory buffer 31, 32. A split block corresponds to a split node of the tree 20, whereas a first child block corresponds to the first child node (as ordered) of that split node. This allows for more efficient memory access and processing, since the most likely child node attributes can be read from a memory block that immediately follows the block corresponding to its parent.

In some embodiments, as for instance illustrated in FIG. 4A and FIG. 4B, memory blocks corresponding to split nodes may all have a same size of S bytes (where, e.g., S=8), while the memory blocks corresponding to the leaf nodes may all have a same size of L bytes, where, for example, S=4 in FIG. 4A or S=8 in FIG. 4B. So, in the memory buffer 31, 32, a memory block succeeding a memory block corresponding to a split node is offset by S bytes, while a memory block succeeding a memory block corresponding to a leaf block is offset by L bytes. Accordingly, to access attributes of a first child node after having processed attributes of its parent nodes, it suffices to read data shifted by 8 bytes in the buffer 31, 32 or the corresponding cache lines. In a less likely scenario where the second child is to be executed instead of the first child node, then the attributes of this node can be accessed by reading data shifted by a larger number of bytes. As such, an implicit ordering of the blocks can thus be exploited, instead of relying on pointers. Precise rules can be devised to access further nodes, as explained later in detail.

As it may be realized, the fact that the nodes 120 are (at least partly) re-ordered in the tree 20 can simply be captured by appropriate flags stored together with attributes of the nodes, as now explained in reference to FIG. 4A and FIG. 4B. Namely, in some embodiments, the mapping operation performed at step S30 may include setting, for each split block, a flag indicative of an operation to be performed upon executing this split node. This flag is a value that is set in accordance with the ordering of the child nodes of that split node, for example, according to how the child nodes of this split node are ordered in the tree 20 as per their likelihoods of access. In detail, owing to the lateral ordering of the child nodes of each split node on each tree level, the most likely nodes are all on a same lateral side of the tree 20, for example, the left-hand side in FIG. 2. Thus, parent nodes that are swapped with respect to the default arrangement that they would otherwise have in the initial tree 10 (FIG. 1) can advantageously include a flag determining the mathematical operations to be performed as part of executing such parent nodes. This way, swapping the nodes amounts to merely changing a flag associated to their parent nodes. The block corresponding to the most likely child node to be accessed after a split node can be immediately contiguous with the block corresponding to this split node, without it being necessary for the block corresponding to that split node to include pointers to its child nodes. The algorithm knows what shifts to consider, thanks to the flag value.

In some embodiments, the decision tree 20 can typically be a binary decision tree. In that case, the flag is indicative of one of two complementary mathematical comparison operations, e.g., based on inequalities. As an example, one operation may consist of comparing whether a feature value x is strictly less than a threshold value t (e.g., x<t), in which case the complementary operation will consist of comparing whether x is larger than or equal to t (e.g., x≥t). Conversely, one of the operations may be ">", in which case the complementary operation will be "≤". In other words, the two complementary mathematical comparison operations may consist of testing whether x<t or x≥t is true or whether x>t or x≤t is true. More generally, sets of complementary operations can similarly be devised for non-binary decision tree, where more than two child nodes may be involved for one or more of the split nodes of the tree.

In FIG. 2, the parent nodes of swapped child nodes are marked with an asterisk; they correspond to blocks storing a flag value equal to 1 in FIG. 4A and FIG. 4B. In the examples of FIG. 4A and FIG. 4B, the memory blocks are built on sub-blocks of 4 bytes each. Each split block is S=8 bytes long. The first two sub-blocks are left empty, as per an optional design choice aiming at ensuring compatibility with other computerized methods. Then, the root node (SN0) is mapped onto the next two sub-blocks. The first sub-block of 4 bytes is used to encode both the feature selector (FT) and a flag value, while the second sub-block of 4 bytes is used to encode the comparison threshold (TH). For example, the first sub-block (4 bytes) may include a 31-bit feature selector (FT) and a 1-bit flag value, where, for example, the bit value 0 corresponds to "<", while the bit value 1 corresponds to "≥". As such, flags can be efficiently encoded and occupy less memory space than pointers, which can result in a substantial benefit for methods involving 100s or 1000s of trees, each having 1000s of nodes. The second sub-block (4 bytes) stores a floating-point threshold value (TH), a single-precision value. The result values to be returned by the leaf nodes can each be a single-precision value mapped onto a single sub-block of 4 bytes, as in FIG. 4A, or a double-precision value stored on two sub-blocks (amounting to 8 bytes, as in FIG. 4B). In variants, the result values could correspond to, integers, for example, for classification purposes and can be mapped onto a smaller number of bytes.

As noted earlier, precise rules can be devised to retrieve relevant blocks. In some embodiments, this implicit ordering is retrieved in accordance with the following rules. First, the offset of the first child block (corresponding to the first child node of this given split node) is equal to the offset of the split block corresponding to this split node plus S bytes, as discussed earlier. Second, the offset of the second child block (corresponding to the second child node of this split node) is equal to the offset of the corresponding split block, to which $2(R-1) \times (S+L)$ bytes are added, where R denotes the number of tree levels in the decision tree 20 under the tree level where the considered split nodes are.

For example, R=4 for the root node SN0 of the tree 20 shown in FIG. 2. Again, all the child nodes of a same split node are ordered from the left on each level of the decision tree 20, according to their likelihood of access. Thus, accessing attributes of the first (e.g., left) node of the root node requires reading values shifted by S=8 bytes with respect to the block corresponding to the rood node. Conversely, accessing attributes of the second (e.g., right) node of the root node requires reading values shifted by $2(4-1) \times (8+8)=128$ bytes with respect to the block corresponding to the root node (assuming that L=8). Next, accessing attributes of the first (e.g., left) node of any subsequent split node requires reading values shifted by S=8 bytes with respect to the block corresponding to that split node. Accessing attributes of the second (e.g., right) node of a split node on the second level (right under the root node level, so that R=3) requires reading values shifted by $2(3-1) \times (8+8)=64$ bytes, and so on. As may be realized, there may be in fact no need to explicitly compute the formula $2(R-1) \times (S+L)$ for a split node under the root node, since it suffices the divide the shift as computed for a split node on an upper level by 2.

As discussed earlier, multiple instances of the decision tree 20 may possibly be executed based on distinct sets of input data, in parallel, using vector processing. Vector processing capabilities of state-of-the-art CPUs can advantageously be exploited to accelerate the processing of multiple trees in parallel. As an example, because of the simple processing steps required by the decision tree nodes, processing multiple trees can be done in parallel using vector instructions.

Additionally, in some embodiments, the present approach can be implemented for two or more decision trees forming part of an ensemble model. In that case, the final inference result will be based on outcomes of step S50 as obtained for each of the decision trees involved. Inferences may, for example, be run on part or all of test data over all binary decision trees, which may form part of, for example, a random forest model, a gradient boosting model, or the like. Each binary decision tree is, nevertheless, processed independently, starting at the respective root node.

The following explains how the nodes can be re-ordered, in reference to FIG. 5. Basically, the aim is to re-order child nodes from a same lateral side of the decision tree 20, according to their likelihood of access after their parent nodes, prior to mapping (at step S30) the nodes 120 onto respective blocks of the memory buffer. Still, as noted earlier, in some embodiments, the re-arrangement of the decision tree can be captured by storing appropriate flag values in relation to the parent nodes, where such flag values determine the operation to be performed while executing the parent nodes.

Figure 1:
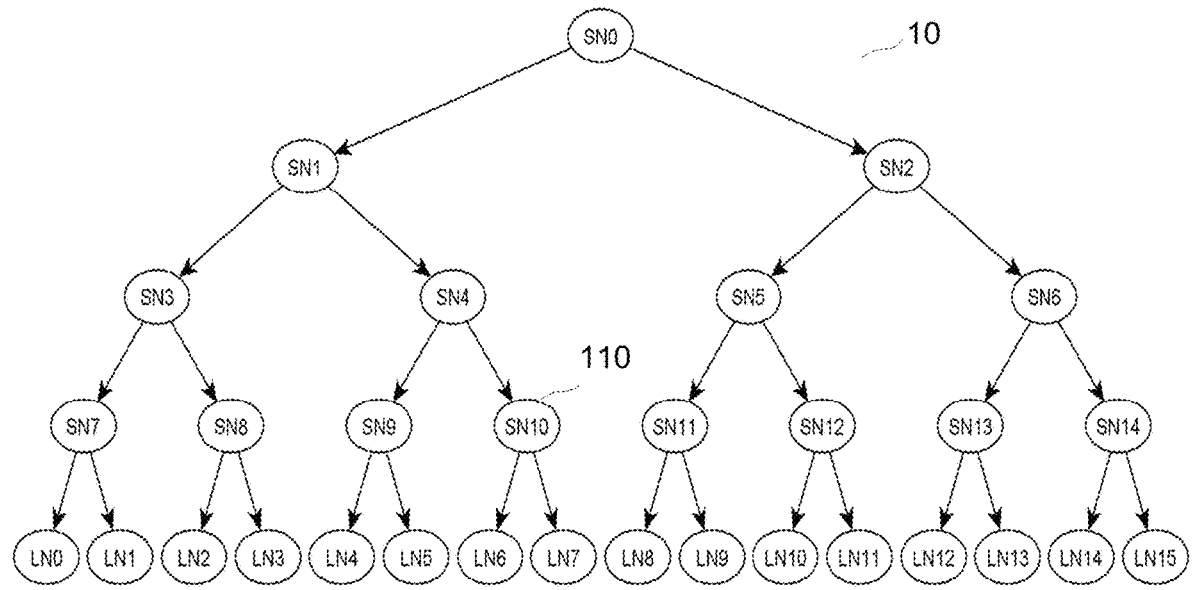
FIG. 1 illustrates an initial decision tree, which includes split nodes and leaf nodes, according to embodiments of the present disclosure.
Figure 2:
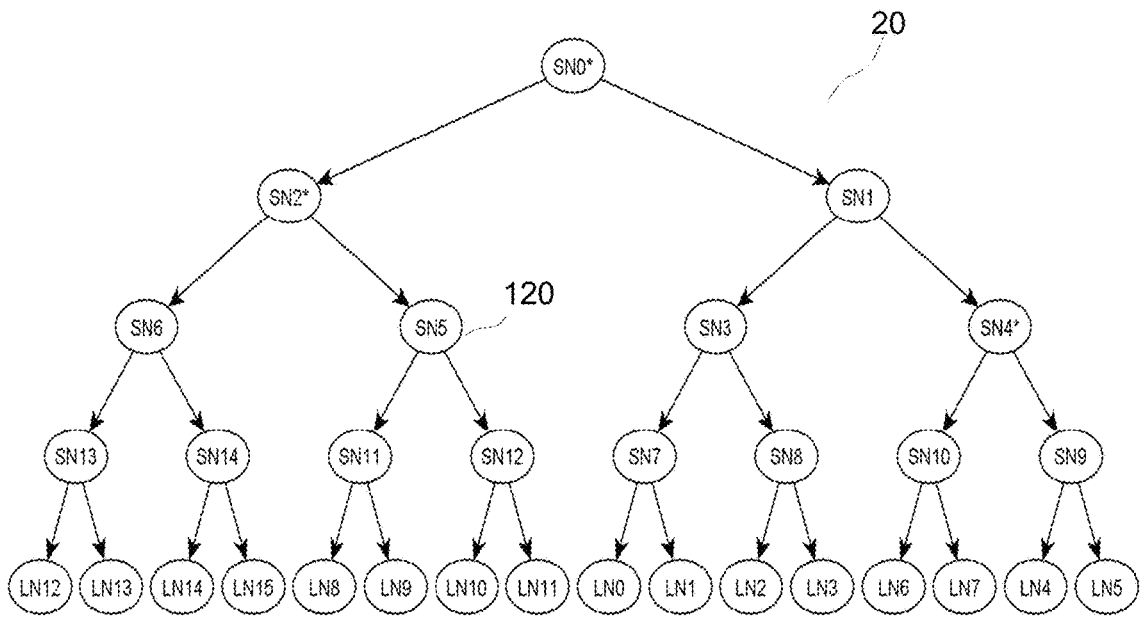
FIG. 2 depicts a re-arranged version of the decision tree of FIG. 1, in which some of the nodes have been swapped according to their likelihood of access, in view of mapping attributes of such nodes onto blocks of a memory buffer, according to embodiments of the present disclosure.

To that aim, during a preliminary phase (FIG. 5), an initial tree is set (step S1) and this decision tree is learned at S2 based on training data, as usual, to obtain a trained decision tree 10, such as depicted in FIG. 1. That is, the cognitive model underlying the decision tree learns its own parameters by processing training examples, as usual. Then, some suitable input data is fed to the model, and the decision tree 10 (as previously learned) is run at step S3 (the parameters of the model are now fixed) in view of identifying likelihoods of access of the child nodes, for example, using a heatmap. As an example, access counts may be monitored. Then, for each binary node (starting at the root note), one may compare access counts of its two child nodes. The child node having the largest access count becomes the "first" node, and so on. The process repeats until all child nodes have been compared. Finally, a re-arranged tree 20 is obtained, as shown in FIG. 2.

The input data used to learn likelihoods of access may simply be the training data themselves, and/or some validation data. Interestingly, the decision tree 20 may possibly be further re-ordered at a later stage, for example, after having performed inferences for substantial test data. That is, access counts can be monitored, from time to time, in view of updating the mapping of the nodes onto the memory blocks (and thus the cache lines, if necessary).

A preferred scenario is the following. First, an initial tree is set at step S1 (FIG. 5). This tree is subsequently learned at S2 based on training data, so as to obtain a trained decision tree 10. Next, the tree 10 is run at S3 based on representative input data (e.g., training data, validation data, some test data, etc.) to learn the access likelihoods. Based on the learned access likelihoods, some of the nodes are finally swapped at S4 (e.g., flags are stored in association with corresponding parent nodes) to obtain a decision tree 20. This tree 20 is then used at S5, S10 for performing steps S20 through S60 shown in FIG. 6. Namely, a memory buffer is set at step S20, in view of mapping node attributes onto memory blocks of this buffer at step S30. Then, such blocks are mapped at S40 onto memory cache lines, in view of (or while) executing the nodes of the tree 20 at S50, to obtain inference results at S60.

Next, according to another aspect, embodiments of the present invention can be embodied as a computer program product for accelerating machine learning inferences. This computer program product comprises a computer readable storage medium having program instructions embodied therewith, wherein the program instructions are executable by processing means (processor) 105 of one or more computerized units 101, see FIG. 7, so as to cause such processing means to perform steps as described earlier in reference to the present methods. In particular, such instructions may cause a computerized unit to leverage vector processing, as discussed earlier.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

Figure 7:
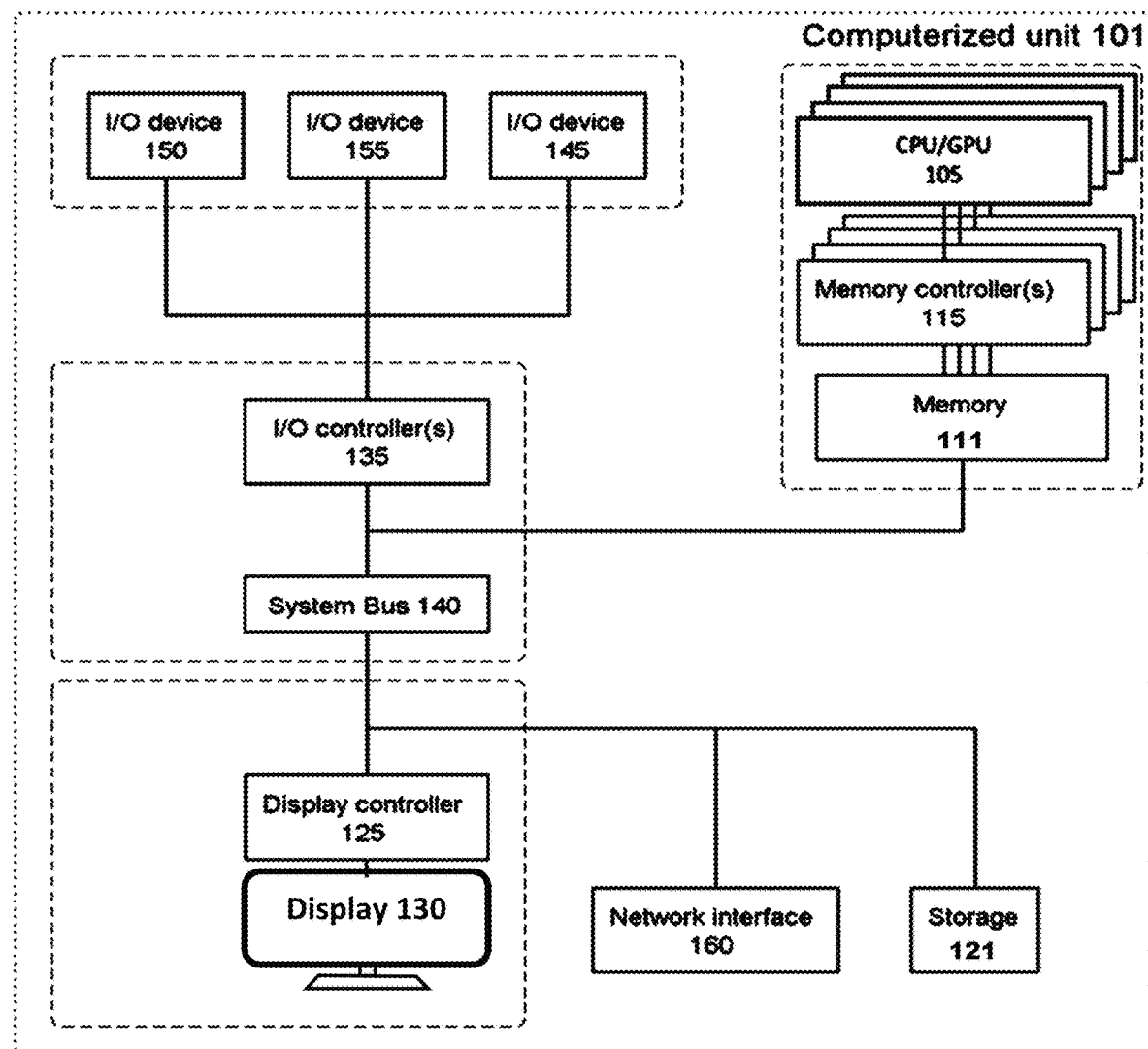
FIG. 7 schematically represents a general-purpose computerized system, suited for implementing one or more method steps, as involved in embodiments of the present invention.

For instance, FIG. 7 schematically represents a computerized unit 101 (e.g., a general- or specific-purpose computer), which may possibly interact with other, similar units, so as to be able to perform steps according to the present methods.

In exemplary embodiments, in terms of hardware architecture, as shown in FIG. 7, each unit 101 includes at least one processor 105, and a memory 111 coupled to a memory controller 115. Several processors (e.g., CPUs, and/or GPUs) may possibly be involved in each unit 101. To that aim, each CPU/GPU may be assigned a respective memory controller, as known per se. In variants, controllers of the unit 101 may be coupled to FPGAs, as mentioned earlier; for example, some of the CPUs/GPUs shown in FIG. 7 may be replaced by FPGAs.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software instructions. The processors 105 can be any custom made or commercially available processor(s). In general, they may involve any type of semiconductor-based microprocessor (in the form of a microchip or chip set), or generally any device for executing software instructions.

The memory 111 typically includes volatile memory elements (e.g., random-access memory), and may further include nonvolatile memory elements. Moreover, the memory 111 may incorporate electronic, magnetic, optical, and/or other types of storage media.

Software in memory 111 may include one or more separate programs, each of which comprises executable instructions for implementing logical functions. In the example of FIG. 7, instructions loaded in the memory 111 may include instructions arising from the execution of the computerized methods described herein in accordance with exemplary embodiments. The memory 111 may further load a suitable operating system (OS). The OS essentially controls the execution of other computer programs or instructions and provides scheduling, input-output control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. Optionally in some embodiments, the computerized unit 101 can be coupled to a storage device (e.g., internal, external, etc.) such as storage 121. Any computerized unit 101 will typically include a network interface or transceiver 160 for coupling to a network, to enable, in turn, data communication to/from other, external components, e.g., other units 101.

The network transmits and receives data between a given computerized unit 101 and another computerized unit 101 and/or other computing devices. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

The present invention may thus be a method, system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method comprising:
    setting, in a memory, a memory buffer that includes contiguous memory blocks;
    obtaining a decision tree comprising nodes including split nodes and leaf nodes, wherein the split nodes include at least two child nodes ordered according to a likelihood of accessing one of the at least two child nodes after accessing an included split node;
    mapping the nodes of the decision tree onto respective blocks of the memory blocks, the memory blocks storing attributes of the mapped nodes, wherein the mapping is performed according to a depth-first search order, wherein the split nodes and included child nodes are mapped onto successive blocks of the memory blocks, wherein the ordered child nodes of an included split node are mapped onto successive blocks of the memory blocks;
    executing the nodes of the decision tree by processing the attributes of the nodes as accessed from the memory according to an order of the memory blocks in the memory buffer; and
    returning an inference result based on an outcome of executing the nodes.

2. The computer-implemented method according to claim 1, wherein memory blocks corresponding to the split nodes have a same size and memory blocks corresponding to the leaf nodes have a same size,
  wherein the memory blocks corresponding to one of the split nodes do not include a pointer to any of the child nodes of the one of the split nodes, and
  wherein, in executing the nodes, the attributes of the nodes are accessed from the memory according to an implicit ordering of the memory blocks in the memory buffer.

3. The computer-implemented method according to claim 1, wherein the method further comprises mapping the memory buffer onto cache lines of a cache memory, wherein the memory blocks of the memory buffer are orderly mapped onto memory blocks of the cache lines according to the order of the memory blocks and the nodes are executed by processing the attributes of the nodes as obtained from the memory blocks of the cache lines.

4. The computer-implemented method according to claim 1, wherein the mapping is performed such that memory blocks including a split block and a first child block are mapped to consecutive memory blocks in the memory buffer,
  wherein the split block corresponds to a split node of the split nodes, and
  wherein the first child block corresponds to a first one of the ordered child nodes of the split block.

5. The computer-implemented method according to claim 4, wherein the memory blocks corresponding to split nodes all have a same size of S bytes,
  wherein the memory blocks corresponding to the leaf nodes all have a same size of L bytes, where L is less than or equal to S.

6. The computer-implemented method according to claim 5, wherein mapping the nodes onto the respective blocks of the memory blocks comprises setting, for eaell a split block, a flag indicative of an operation to be performed upon executing a corresponding split node, the flag set in accordance with how the child nodes of the corresponding split node are ordered according to their likelihood of access.

7. The computer-implemented method according to claim 6, wherein the decision tree is a binary decision tree and the flag is indicative of one of two complementary mathematical comparison operations.

8. The computer-implemented method according to claim 7, wherein the two complementary mathematical comparison operations are based on inequalities.

9. The computer-implemented method according to claim 7, wherein the two complementary mathematical comparison operations include testing whether x is less than t or x is greater than or equal to t is true and testing whether x is greater than t or x is less than or equal to t is true, where x corresponds to a feature value to be tested and t corresponds to a threshold value.

10. The computer-implemented method according to claim 7, wherein the memory blocks corresponding to a split node do not include a pointer to any of the child nodes of the split node,
  wherein, in executing the nodes, the attributes of the nodes are accessed from the memory according to an implicit ordering of the memory blocks in the memory buffer, and
  wherein the implicit ordering of the memory blocks results in accessing attributes of child nodes of a split node in accordance with the following rules:
    an offset of a first child block corresponding to the first child node of each the split node is equal to an offset of the split block corresponding to the split node plus S bytes; and
    an offset of a second child block corresponding to the second child node of the split node is equal to the offset of the split block corresponding to the split node plus $2(R-1) \times (S+L)$ bytes, where R denotes a number of tree levels in the decision tree under a tree level that includes any of the split nodes.

11. The computer-implemented method according to claim 6, wherein, at mapping the nodes onto the respective blocks of the memory blocks, the size S of the split block is equal to 8 bytes, in which 4 bytes are used to encode a comparison threshold and 4 bytes are used to encode both a feature selector and the flag.

12. The computer-implemented method according to claim 1, wherein multiple instances of the decision tree are executed based on distinct sets of input data, in parallel, using vector processing.

13. The computer-implemented method according to claim 1, wherein two or more decision trees form part of an ensemble model, such that the inference result returned is based on an outcome of executing the nodes of the two or more decision trees.

14. The computer-implemented method claim 1, wherein the method further comprises, prior to mapping the nodes onto the respective blocks of the memory blocks, ordering the child nodes of the split nodes from a same lateral side of the decision tree according to a likelihood of access for the child nodes after the split nodes.

15. The computer-implemented method according to claim 14, wherein the method further comprises, prior to ordering the child nodes:
  learning the decision tree based on training data; and
  based on input data, running the decision tree as learned to identify the likelihood of access.

16. The computer-implemented method according to claim 15, wherein the input data, based on which the decision tree as learned is run to identify said likelihood of access, includes at least some of the training data and validation data.

17. A computer program product for accelerating machine learning inferences, the computer program product comprising a computer readable storage medium having program instructions embodied therewith, the program instructions executable by processing means to cause the processing means to:
  set, in a memory of a computerized system, a memory buffer that includes contiguous memory blocks;
  obtain a decision tree that comprises nodes including split nodes and leaf nodes, wherein the split nodes include at least two child nodes ordered according to a likelihood of accessing one of the at least two child nodes after an included split node; and
  map the nodes of the decision tree onto respective blocks of the memory blocks, the memory blocks storing attributes of the mapped nodes, wherein the mapping is performed according to a depth-first search order, wherein the split nodes and included child nodes are mapped onto successive blocks of the memory blocks, wherein the ordered child nodes an included split node are mapped onto successive blocks of the memory blocks.

18. The computer program product according to claim 17, wherein the program instructions are executable by the processing means to further cause the processing means to:

execute the nodes of the decision tree by processing the attributes of the nodes as accessed from the memory according to an order of the memory blocks in the memory buffer; and return an inference result based on an outcome of executing the nodes.

19. The computer program product according to claim 18, wherein the program instructions are executable to further cause the processing means to:

map the memory buffer onto cache lines of a cache memory, wherein the memory blocks of the memory buffer are orderly mapped onto memory blocks of the cache lines according to the order of the memory blocks and the nodes are executed by processing the attributes of the nodes as obtained from the memory blocks of the cache lines, in operation.

20. A computer system comprising:

a processor set; and a computer readable storage medium;

wherein:

the processor set is structured, located, connected and programmed to run program instructions stored on the computer readable storage medium; and the stored program instructions include:

program instructions programmed to set a memory buffer that includes contiguous memory blocks;

program instructions programmed to obtain a decision tree that comprises nodes including split nodes and leaf nodes, wherein the split nodes include at least two child nodes ordered according to a likelihood of accessing one of the at least two child nodes after an included split node; and program instructions programmed to map the nodes of the decision tree onto respective blocks of the memory blocks, the memory blocks storing attributes of the mapped nodes, wherein the mapping is performed according to a depth-first search order, wherein the split nodes and included child nodes are mapped onto successive blocks of the memory blocks, wherein the ordered child nodes an included split node are mapped onto successive blocks of the memory blocks;

program instructions programmed to execute the nodes of the decision tree by processing the attributes of the nodes as accessed from the memory according to an order of the memory blocks in the memory buffer; and program instructions programmed to return an inference result based on an outcome of executing the nodes.

\* \* \* \* \*